United States Patent [19]
Grover

[11] Patent Number: 5,274,397
[45] Date of Patent: Dec. 28, 1993

[54] LARGE-FORMAT PLOTTER USING SEGMENTED RASTER-SCANNING

[75] Inventor: David N. Grover, Littleton, Colo.

[73] Assignee: Firstech Properties Company, Littleton, Colo.

[21] Appl. No.: 699,887

[22] Filed: May 14, 1991

[51] Int. Cl.⁵ .......................... B11J 2/47; G01D 15/16
[52] U.S. Cl. ...................................................... 346/108
[58] Field of Search ..................... 346/1.1, 107 R, 108, 346/160; 358/296, 300, 302

[56] References Cited

U.S. PATENT DOCUMENTS

| | | |
|---|---|---|
| 3,963,340 | 6/1976 | Gerace . |
| 4,511,268 | 4/1985 | Marshall .............................. 400/119 |
| 4,639,749 | 1/1987 | Ito ..................................... 346/153.1 |
| 4,727,381 | 2/1988 | Bille et al. ........................... 346/108 |
| 4,897,677 | 1/1990 | Lai ...................................... 346/155 |
| 5,018,210 | 5/1991 | Merryman et al. ....................... 382/8 |

Primary Examiner—Mark J. Reinhart
Attorney, Agent, or Firm—James E. Pittenger

[57] ABSTRACT

A large-format plotting device is provided for transferring an image to a relatively large sized medium. A data processing device is used to divide the surface of the medium into a plurality of relatively narrow segments. A beam sweeping device, which can include a high energy beam such as a laser beam, is provided for sweeping the beam the width of the segment. The data processing device causes the beam to turn on and off to define a portion of the desired image. A movement mechanism is included to either move the beam generating device or the support for the medium at a desired velocity so that each sweep of the beam will produce a raster line whereby the entire segment will be swept forming a pluralit of parallel raster lines covering the entire segment. The movement mechanism also includes placement mechanism for laterally moving the medium support or beam generating device to the next adjacent segment in sequence until the surface of the entire medium has been imaged. Alignment features can be provided so that the corresponding raster lines in each segment can be aligned so that they coincide and so that the beam will not overlap at the contiguous edges of the segments. Sensors can be provided on the beam generating device or on the medium to identify the edges of the desired segments. The medium can also be mounted on a rotating drum whereby the movement mechanism rotates the drum at a desired velocity synchronized with the sweep of the beam generating device. Raster-scan imaging is controlled by the data processing device which simultaneously controls the beam generating device for the sweep and intensity of the beam as well as the operation of the positioning mechanism.

28 Claims, 9 Drawing Sheets

Fig_1
(PRIOR ART)

Fig_2
(PRIOR ART)

Fig_3A

Fig_3B

Fig_3C          Fig_3D

Fig_4A

Fig_4B

Fig_5

Fig_6

Fig_7

Fig_8

Fig_9

Fig_10

Fig_13

Fig_11A

Fig_11B

Fig_11C

Fig_11D

Fig_11E

Fig_11F

Fig_11G

Fig_11H

Fig_11I

Fig_11J

Fig_11K

Fig_11L

Fig_11M

Fig_12

LARGE-FORMAT PLOTTER USING SEGMENTED RASTER-SCANNING

TECHNICAL FIELD

The present invention relates generally to plotters using raster-imaging and more particularly to a novel approach to plotting relatively large images with a minimum amount of distortion at the margins.

BACKGROUND OF THE INVENTION

Figure 1:
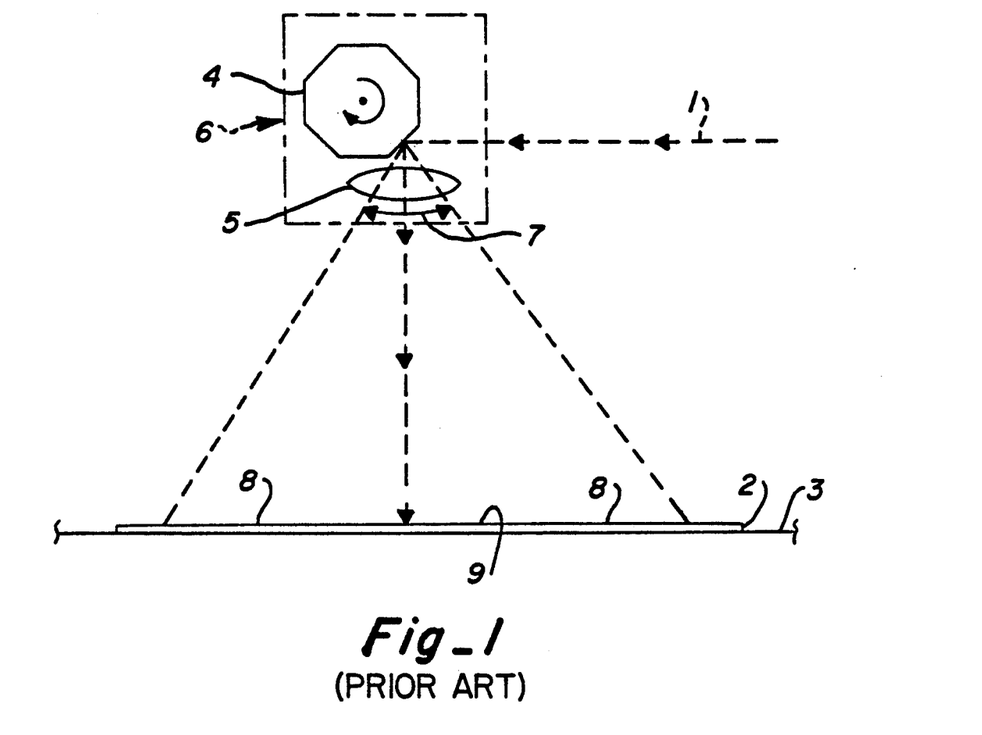
FIG. 1 is a pictorial diagram showing a typical arrangement of a prior art raster-scan plotter.

FIG. 1 shows the typical configuration of prior art raster-scan or imaging plotters. A beam 1, usually a laser beam, is directed at a medium 2, such as a sheet of specially treated photosensitive paper or film. The beam 1 continuously sweeps or scans across the medium 2 as the medium moves in a direction perpendicular to the sweeps of the beam to form a series of parallel lines spanning the width of the medium. These lines are called sweep paths or raster lines and a series of these lines produces a desired image. In a typical plotter or printer a rotating multi-sided (polygon) mirror 4 is used to direct or sweep the beam 1, although other means can be used. The beam 1 is focused by means of a lens 5, normally positioned between the mirror 4 and the medium 2.

Typically, the photo-sensitive medium 2 is mounted on a mounting support device 3 such that the medium can be moved in relation to the beam-mirror lens assembly 6 in a direction perpendicular to the raster lines the beam 1 creates on the medium 2. This relative movement can be accomplished by moving either the beam-mirror-lens assembly 6 or the mounting device 3. The mounting device is often either a flatbed support as discussed in U.S. Pat. No. 4,585,938 issued to Newmann et al. or a rotating drum as discussed in U.S. Pat. No. 4,691,212 issued to Solcz et al.

Figure 2:
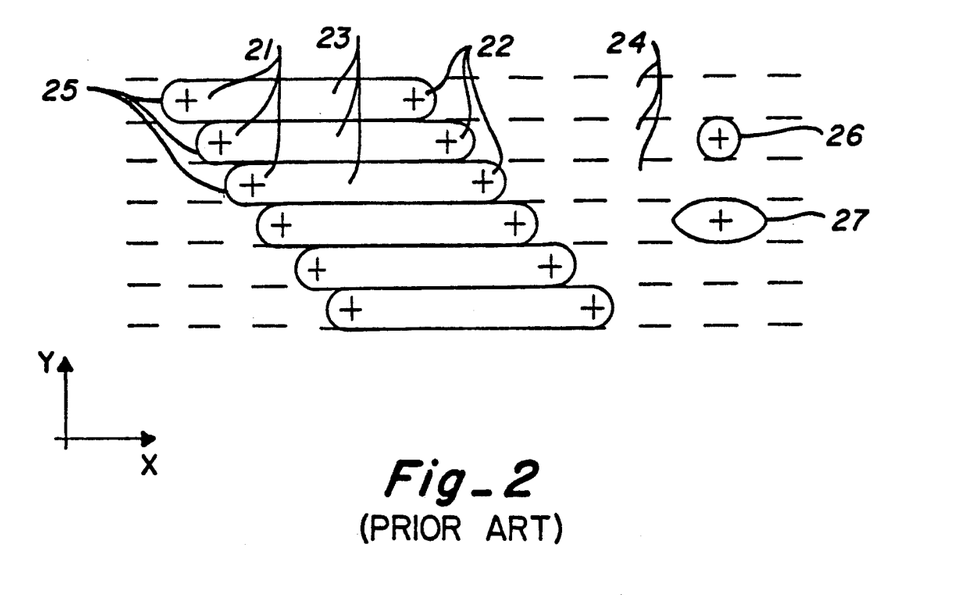
FIG. 2 is an enlarged diagram of an image plotted by a prior art raster-scan plotter.

In typical raster-scan plotters, the energy beam 1 is turned on to create a mark on the medium 2, and turned off to leave a blank space on the medium 2. By turning the beam on and off at predetermined points a contrasting or visible pattern can be created on the medium 2. FIG. 2 shows a magnified detail of a simplified scan. Although typically black, the raster marks 23 are shown here as white with black borders for clarity. In FIG. 2, the beam sweeps from left to right, parallel to the X-axis, turning on 21 and turning off 22 at predetermined points to create a black and white pattern or visible image.

In FIG. 2, the turn on points 21 and the turn off points 22 are marked by crosses. Because the mark that the beam forms on the medium when the beam hits the medium perpendicularly is generally a round dot 26, the raster mark 23 formed by the beam has round or semi-circular ends 25. Each scan or raster mark 23 is very thin. A large number of sweeps or raster lines 24 must be made in order to create a visible pattern. Because of this, the jagged edges caused by the rounded ends 25 of the scan marks 23 are nearly invisible to the naked eye.

Typically, a raster line 24 is divided into a large number of pixels or dots, and the turn-on and turn-off commands for the beam are given coordinates for the pixel where the turn-on or turn-off is to be performed. The Y-coordinate for each pixel represents on which raster line 24 the pixel is located. The X-coordinate represents where on the specific raster line 24 the pixel is located. Of course, a different coordinate system could be used to designate the positions of the pixels.

The prior art has several problems, including the following.

Because of the large sweep angle 7 (see FIG. 1) required to sweep the width of the medium, the pixels or dots created by the beam toward the margins 8 of the medium tend to become oval 27. (See FIG. 2.)

The large sweep angle 7 also requires that large and specially designed focusing lens or f-theta lenses 5 be used. Such large special lenses are very expensive.

Because the beam has a longer distance to travel to the edges of the medium 8 than to the middle 9, the distance the beam travels between the lens and the medium necessarily varies from the fixed focal length of the lens, and thus the outer pixels tend to become defocussed.

In addition, because of the long distance the beam needs to travel, especially at the edges, any jitter present in the mirror assembly 4 becomes magnified.

Further, the prior art systems typically must have large processing and memory requirements, because each sweep path 24 is so long each path has many turn-on and turn-off commands which greatly increase the number of commands that must be processed.

Information Disclosure Statement

The following information is provided in response to the applicant's duty to disclose all information which is pertinent to the examination of this application. There should be no inference that the applicant has performed a search for prior art relevant to this invention.

U.S. Pat. No. 4,739,416, issued to Marian, discloses an apparatus for reproducing a digitized image. The Marian device uses a rotating drum as the mounting means, and a plurality of light sources, which do not sweep lines in an axial direction with respect to the drum. By rotating the drum and slowly moving the light sources in an axial direction, each light source scans a circumferential, helical path around a segment of the drum.

U.S. Pat. No. 4,698,648, issued to Takahashi discloses an apparatus that records a plurality of images on a given medium. In one embodiment (see FIG. 9), the Takahashi device includes a rotating drum and a beam-mirror-lens assembly that can be moved to a number of positions along a line parallel to the axis of the drum. This permits recording onto a single large piece of film several complete images from each position.

SUMMARY OF THE INVENTION

The present invention provides a plotter that can reproduce relatively large images with high resolution and little distortion at the edges. The present invention includes a beam sweeping arrangement for projecting a beam onto a medium, such that the beam repetitively sweeps raster lines across one segment of a number of relatively narrow segments formed across the medium. The invention also includes movement and placement mechanisms for continuously moving the medium in relation to the beam sweeping arrangement and in directions transverse and parallel to the raster lines eventually forming a full width image across the medium. A system for aligning the plurality of segments of the image in the direction generally parallel to the raster lines is provided such that there is neither an overlap of the segments nor a space between the segments when they are plotted.

BRIEF DESCRIPTION OF THE DRAWINGS

These and other features of the invention will be more readily understood by the detailed description when taken with the accompanying drawings Like reference numbers identify like parts.

DESCRIPTION OF SPECIFIC EMBODIMENTS

Figure 3A:
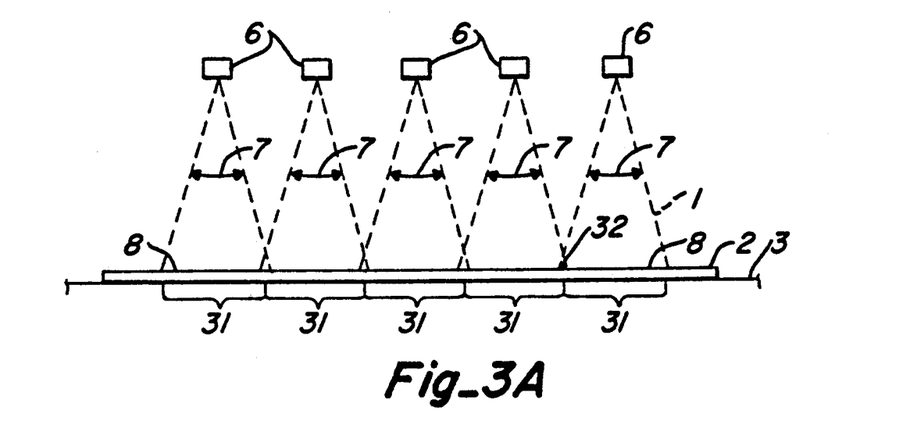
FIG. 3A is a pictorial diagram showing a front view of an embodiment of the present invention.

FIG. 3A shows one embodiment of the invention. This embodiment has five beam sweeping arrangements or devices 6, each of which may be similar to the beam-mirror-lens assemblies of the prior art. Of course, a different number of beam sweeping devices could be used by the invention. Each beam sweeping arrangement sweeps the width of a segment 31 on the film 2. FIG. 3A shows each sweeping device is able to cover an area larger than the segment over which it is located so that the sweep angles 7 overlap each other in an area 32. There is actually no need for the beam to be turned on to create a mark in a neighboring segment 31. Thus, the neighboring segment can be adequately covered by the respective sweeping arrangement 6 located above it.

The sweep angles 7 of the device depicted in FIG. 3A are narrow compared to that of the typical prior art raster-scan plotter as shown in FIG. 1. In the present embodiment, sweep angles of 7.5° and segments two inches wide can be used; however, a broad range of angles and widths can be used, if desired. The smaller sweep angles 7 of the present invention means that the pixel or dot formed by the beam 1 striking the medium 2 is more round and less oval at the margins 8 than at the margins of the prior art raster-scan plotters. The smaller sweep angles 7 also mean that the very large special lenses used in many prior art sweeping arrangements (see FIG. 1), are not necessary, and smaller, much less expensive, lenses can be used. Because the optical path length does not substantially vary, there is less defocussing at the edges than in prior art raster plotters. The sweeping device or arrangement can also be located close to the mounting device 3 and the medium 2, since each sweeping device 6 has a smaller area to cover. Because any number of sweeping devices 6 can be used in the present invention, embodiments of the present invention could theoretically be built to cover a medium of any size.

Figure 3B:
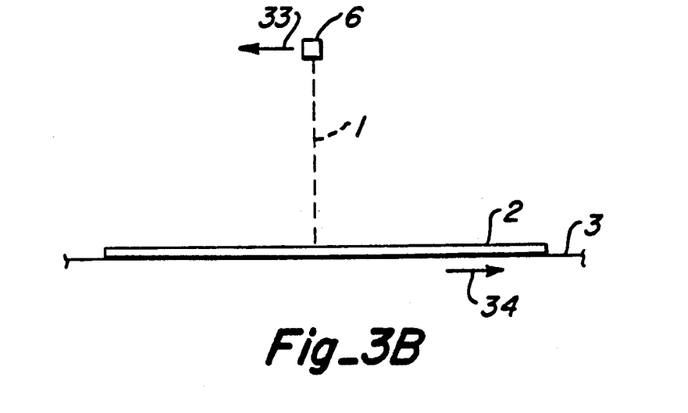
FIG. 3B shows a side view of the embodiment shown in FIG. 3.

FIG. 3B shows a side view of the plotter depicted in FIG. 3A. A flatbed support is used as the mounting device 3 for the medium 2. In this particular embodiment, the sweeping devices or arrangements 6 are lined up in a row, so that in this side view 5 only one sweeping arrangement 6, the one on the far left of FIG. 3A, is visible. In an alternative embodiment, the plurality of sweeping arrangements 6 can be staggered. The beam 1 appears to go straight down in FIG. 3B, although it can be seen to sweep back and forth in the view shown in FIG. 3A. In addition to plotting on typical medium, such as film or paper, the flatbed device can also be used to scan images directly on a printed circuit board or a photo-conductive drum which transfers the image to another medium.

In order to achieve a series of raster lines within a segment that are arranged parallel and adjacent to each other (as shown in FIG. 2), it is necessary to move the beam sweeping arrangements 6 relative to the medium 2 in a direction transverse to the raster lines being swept by the beam, and at just the right velocity. This relative movement can be accomplished for instance, either by moving the sweeping arrangement 6 in a direction as indicated by arrow 33, or by moving the flatbed support 3 or rotating a drum 3' in a direction indicated by arrows 34 or 35. In order to maintain the correct relative velocity, a variety of mechanisms well known in the art can be used.

Figure 3C:
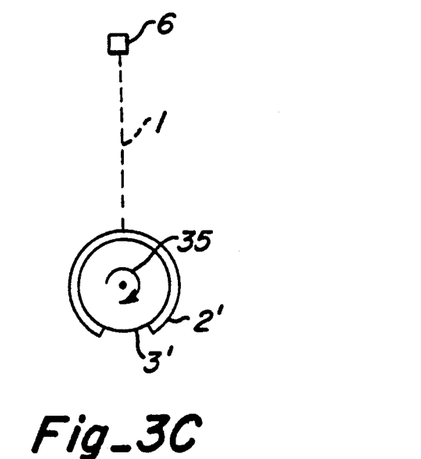
FIG. 3C shows a side view of an alternative embodiment of the invention.

FIG. 3C shows a side view of an alternative embodiment based on the embodiment depicted in FIG. 3A. A drum 3' is used as a mounting device for the photosensitive medium 2' instead of a flatbed 3 as shown in FIG. 3B. The beam 1 is swept in an axial direction with respect to the drum. In order to achieve the relative movement between the sweeping means 6 and the medium 2', the drum 3'can be rotated in the direction shown by arrow 35. Otherwise, the device shown in FIG. 3C is identical to the device shown in FIGS. 3A and 3B.

Figure 3D:
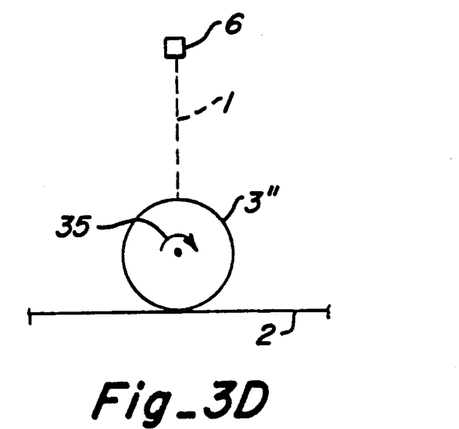
FIG. 3D shows a variation of the embodiment shown in FIG. 3C.

FIG. 3D shows a rotating drum 3" which is used as the primary imaging device. This type of drum which has a photoconductive coating is widely used in xerography. In this application, the surface of the rotating drum is electrostatically charged with the polarity of the charge forming the scanned image. The correctly polarized image attracts toner and transfers the toner to the medium such as plain paper to produce the image. A fusing roller or other high heat device is then used to fuse the toner and image to the paper. The drum 3" is used as an imaging and image transfer device rather than as a mounting device for the final medium 2 as shown in FIG. 3B. The beam is swept in an axial direction with respect to the drum. In order to achieve the relative movement between the sweeping means 6 and the medium 2, the drum can be rotated in the direction shown by arrow 35. In this embodiment the length of the drum can correspond to the approximate width of the equal segments of the image.

Figure 4A:
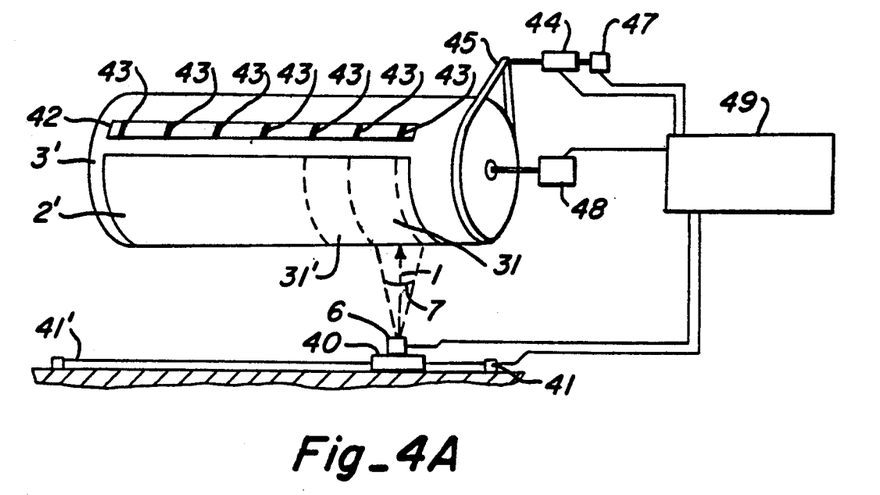
FIG. 4A shows a perspective view of a rotating photosensitive drum embodiment of the invention.
Figure 4B:
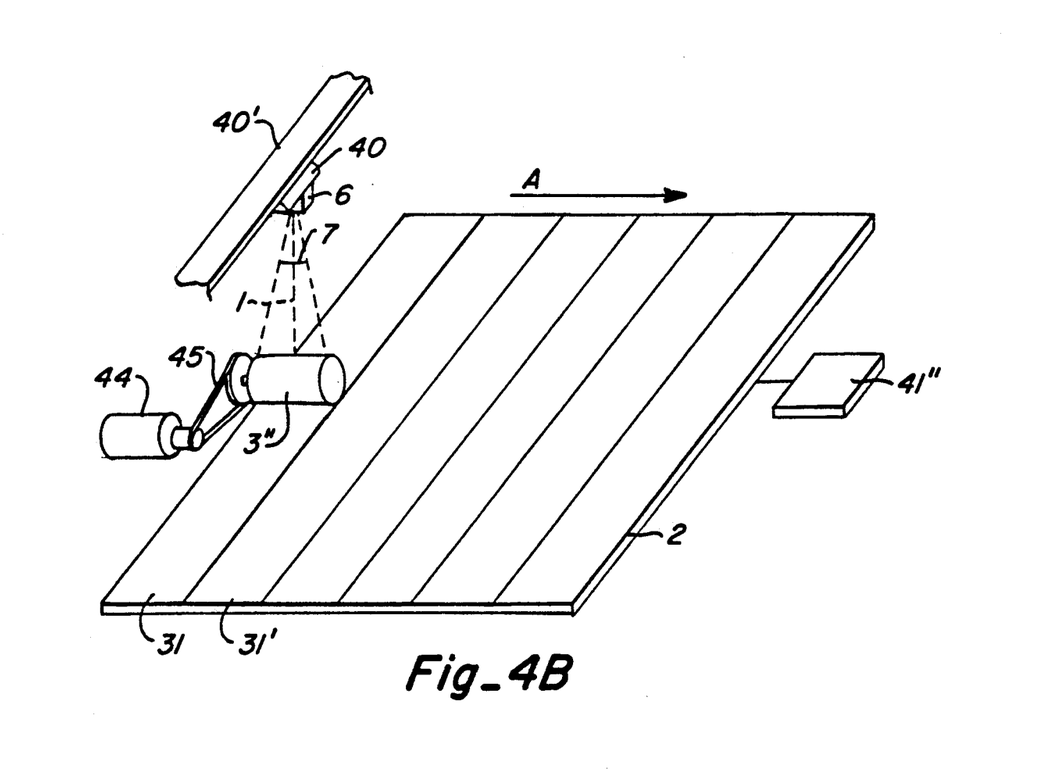
FIG. 4B shows the embodiment of FIG. 4A forming a segment on the medium.

FIGS. 4A and 4B show the general arrangement of a preferred embodiment of the invention. This embodiment is similar to the embodiment depicted in FIG. 3C, except the drum 3, which is rotated by means of a motor 44 and a belt 45, is located above or below the sweeping arrangement 6. FIG. 4A is simplified for the sake of clarity. The device shown here is divided off into six two-inch segments to cover the medium As noted before, any number of segments can be used, and segments of various widths can be used if required. It is to be understood that a support structure (not shown) is necessary to support the drum 3' over or under the sweeping means 6. Also not shown is an enclosure which surrounds the device in order to prevent dust from settling on the plotter.

In this preferred embodiment, a single beam sweeping arrangement 6 is used. In FIG. 4A, a placement mechanism 41 is used to move the sweeping arrangement 6 in a direction generally parallel to the raster lines swept by the sweeping arrangement 6. The single sweeping arrangement 6 is mounted on top of a movable laser carriage 40. While the laser carriage 40 is centered and stationary with respect to the first segment 31, and as the drum 3' turns, the beam 1 is swept across the first segment 31 of the medium 2'. When the segment 31 is completely imaged, the laser carriage 40 is moved with respect to the next segment 31', which is in turn swept, and this process continues until all of the segments are completely swept. Preferable, the sweeping arrangement 6 is located at the center of each of the segments being swept, so that the angle of the beam 1 is as perpendicular as possible when striking either margin of the segment. This will minimize the amount of distortion at the margins of the segments. The laser carriage 40 can be moved into place by a variety of placement mechanisms 41, including a simple pulley system or a long rotating screw. The preferred embodiment uses a chain and sprocket system with a motor to move the laser carriage 40 movable mounted on rails 41', FIG. 4B shows a perspective variation of the preferred embodiment of the invention. This variation is similar to the embodiment shown in FIG. 3D, except the drum 3", which is rotated by a motor 44 and a belt or gear assemble 45 is located below the sweeping arrangement 6. In this embodiment, the drum has a photoconductive coating which transfers its image to the medium 2 as the sweeping arrangement 6 is moved on the laser carriage 40. FIG. 4B is simplified for the sake of clarity. The device shown here uses six segments to cover the entire medium. As noted before, any number of segments can be used. Of course, some sort of well known structure (not shown) can be used to support the drum 3", the sweeping assembly and the rail assembly in concert with the placement mechanism 41". Also not shown is an enclosure which surrounds the device in order to prevent dust from settling on the plotter and to exclude stray light from the photoconductive imaging device.

In this preferred embodiment, a single beam sweeping device is used. A placement mechanism 41" is used to move the medium 2 in a direction generally parallel to the raster lines swept by the sweeping means to establish the matching position of the image of the next segment. The single sweeping arrangement 6 is mounted to a movable laser carriage 40. While the laser carriage is centrally positioned above the first segment 31, and as the drum 3" turns, the beam 1, is swept across width of the drum and the image is transferred to the first segment 31 on the medium 2. When the segment 31 is completely swept or imaged, the medium 2 is moved to the next segment 31' by the medium placement mechanism 41", and this process continues until all of the segments are completely swept. As in the embodiment of 4A, the center of each segment 31 is preferably located under the center of the sweeping arrangement 6 to minimize the amount of distortion at the margins of the segment 31. Also, the laser carriage 40 can move the sweeping arrangement 6 by a variety of movement mechanisms 40' including a pulley system, or a long rotating screw on a gear and track system. The preferred embodiment uses a gear and a track system to move the laser carriage 40 which can be mounted on rails.

Figure 5:
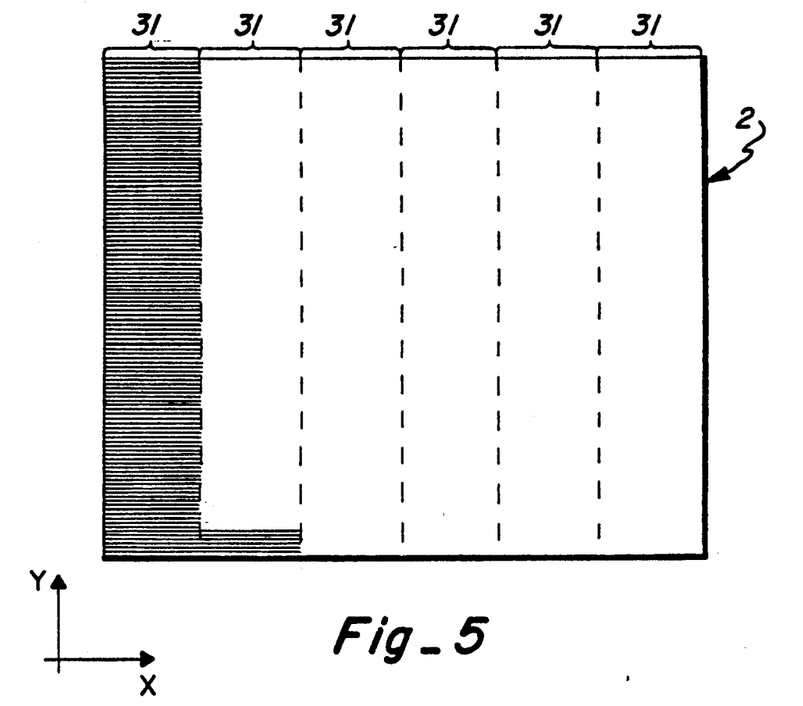
FIG. 5 shows a medium that has been partially imaged by the embodiment shown in FIG. 4B.

FIG. 5 depicts a partially imaged medium 2, and shows how the beam 1 of the preferred embodiment covers the medium 2. Starting on the bottom of the segment 31 on the left-hand side of the medium 2, the sweeping arrangement sweeps a raster line spanning the width of the segment. Because the medium is mounted on a constantly rotating drum, when the sweeping arrangement sweeps a second line, this second line is adjacent and parallel to the first line. The sweeping arrangement sweeps a series of lines in such a fashion from the bottom of the segment to the top covering the whole segment. Then the placement mechanism moves the next segment of the medium into alignment with the sweeping arrangement and drum and the next segment is likewise swept from bottom to top. Then the placement mechanism moves the next segment of the medium into alignment with the sweeping arrangement and drum and the next segment which is likewise swept from bottom to top. This is repeated until all of the segments are covered. As mentioned previously the beam is not always on as it is swept from side to side It is turned on to create a series of dots or marks on the photosensitive medium 2. In an alternative embodiment, in which a flatbed support is used as a mounting device instead of a drum, a single sweeping arrangement can cover the segments in a similar fashion, or alternatively, from bottom to top, and then from top to bottom, etc.

In the preferred embodiment, in which a photoconductive drum is used, a single imaging arrangement will preferably image the segments in a similar fashion by imaging on the photoconducting coating and then electrostatically transferring the image to the medium by the use of toner or other appropriate transfer medium.

In order to properly produce the desired image, it is important to align the segments properly. The segments need to be aligned horizontally; that is, each segment must abut and match the next segment. There cannot be any overlap or space between the segments. The segments must also be aligned vertically; that is, the first line of each segment must line up with all of the other first lines, the second line of each segment must line up with all of the other second lines, etc.

One way to achieve horizontal alignment is simply to use the placement mechanism to move the laser carriage 40 the distance precisely equal to the width of a segment each time a new segment is to be started. However, it is difficult to retain the tolerances necessary with such a mechanical system, and the constant movement of the laser carriage 40 can soon wear the movement mechanism 40', especially if it is a simple pulley system, so that the very fine tolerances required can not be maintained. Although, in the preferred embodiment shown in FIG. 4B, a mechanical system is used as the placement mechanism 41" for moving the laser platform to roughly the correct location, the mechanics of the placement mechanism are not necessarily relied upon to assure that the segments are horizontally aligned.

The preferred embodiment uses the sweeping beam to align the segments horizontally. Preferably, a precision machined gauge bar 42, which can be seen in FIG. 4A, is used to mark the borders of the segments. This gauge bar is made out of reflective material except for a series of non-reflective gauge marks 43 that are located at intervals along the gauge bar 42. A chrome-plated metal bar with notches cut in its side can be used. The distance between each gauge mark 43 is the exact width of each segment 31. Preferably, each segment is of the same width. Because the gauge bar 42 is firmly affixed to the rotating drum 3', it is much less likely to warp than the placement mechanism 41" which is used to move the laser carriage 40. Therefore, the gauge bar 42 can maintain the necessary close tolerances, indefinitely.

Figure 6:
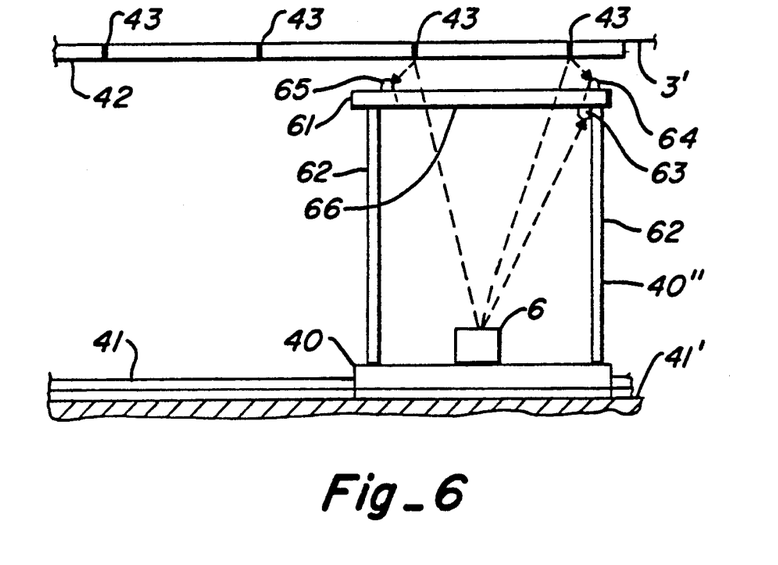
FIG. 6 shows a close-up of the embodiment shown in FIG. 4B including the sensor platform thereof.
Figure 7:
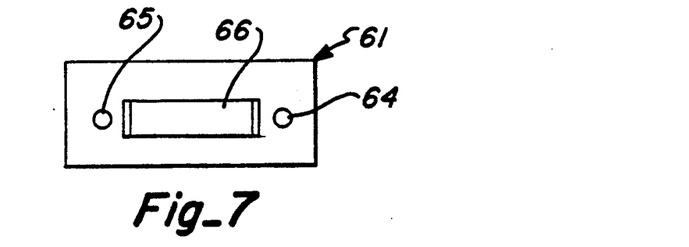
FIG. 7 shows a top view of the sensor platform shown in FIG. 6.

FIG. 6 shows the system that is used to "read" the gauge marks 43. A pair of gauge marks which delineate a segment must be read before plotting the segment. A sensor platform 61 is mounted on struts 62 on top of the laser carriage 40 so that it is close to the drum 3' or flatbed support 3. FIG. 7 shows a top view of the sensor platform 61, and shows a slot 66 that the beam can sweep back and forth through. The platform 61 has three light sensitive sensors, a reference sensor 63 on the bottom of the platform 61, and a start-of-segment sensor 64 and an end-of-segment sensor 65 on top of the platform 61 on either end of the slot 66. All three sensors generate output signals, which are sent to a data processing computer system. Reference sensor 63 generates an output signal when it is struck by the sweeping beam at the beginning of the sweep. This signal is used as a reference. The reference sensor 63 may be partially painted over in order to produce a sharply peaked output signal. Start-of-segment sensor 64 indicates when the beam sweeps across a gauge mark 43, which is non-reflective. This sensor can detect when the beam sweeps across the gauge mark 43 because it can sense the laser beam reflecting off the gauge bar 42 until the beam hits the gauge mark 43, which does not reflect the beam back to the sensor. The beam continues its sweep, and eventually the end-of-segment sensor 65 senses when the beam strikes the next non-reflective gage mark 43.

Figure 8:
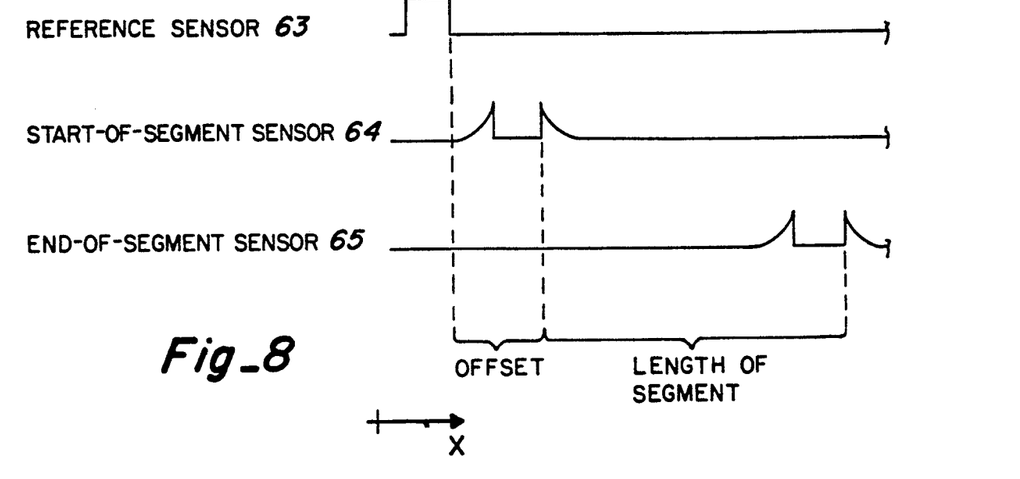
FIG. 8 is a diagram showing the output signals generated by the sensors.
Figure 9:
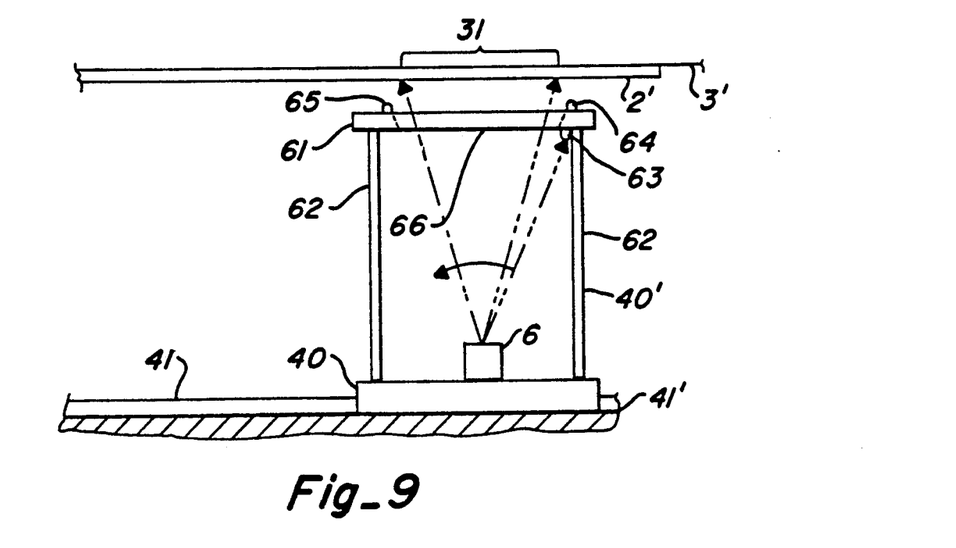
FIG. 9 shows the same view as FIG. 6 with the device in a different position.

FIG. 8 shows representative output signals generated by the sensors 63, 64, 65 when the gauge bar is directly over the sensor platform. Preferably, when the gauge bar is in this position, the beam is turned on full. The computer system controlling the beam stores the amount of time elapsed between the reference sensor's signal and the start-of segment sensor's signal. The computer system also stores the time elapsed between the start-of-segment signal pulse and the end-of-segment signal pulse. The computer system determines the position of the sweeping arrangement 6 in relation to the gauge marks, and thus determines where the segment 31 should be in relation to the sweeping arrangement 6. When the drum 3' rotates so that the gauge bar is no longer over the sensing platform, and is scanning the medium 2', as shown in FIG. 9, the computer system uses the stored segment information to determine when to begin and end the segment 31. The reference sensor 63 is still activated on each sweep even when the gauge bar is no longer above the sensor platform. The start-of-segment and end-of-segment sensors are not used when the gauge bar is not over the sensor platform. The computer system uses the pulse from the reference sensor 63 to start the clock running, and starts and ends the segment based on the timing information it stored during the sweep across the gauge bar. Because the thickness of the film or other medium is probably different than the thickness of the gauge bar, and may vary from application to application, the thickness of the medium being used must be input into the computer system, so that the computer can make the necessary calculations in order to accurately adjust to the beginning and end of each segment.

After a segment has been covered, the placement mechanism moves the sweeping arrangement a distance approximately equal to the width of a segment. The sweeping arrangement then scans the gauge bar again, and information regarding the location of the next segment in relation to the sweeping arrangement is derived from the sensors. The computer processes the readings of the sensors and then the next segment is swept. This process continues until all the segments are swept.

Figure 10:
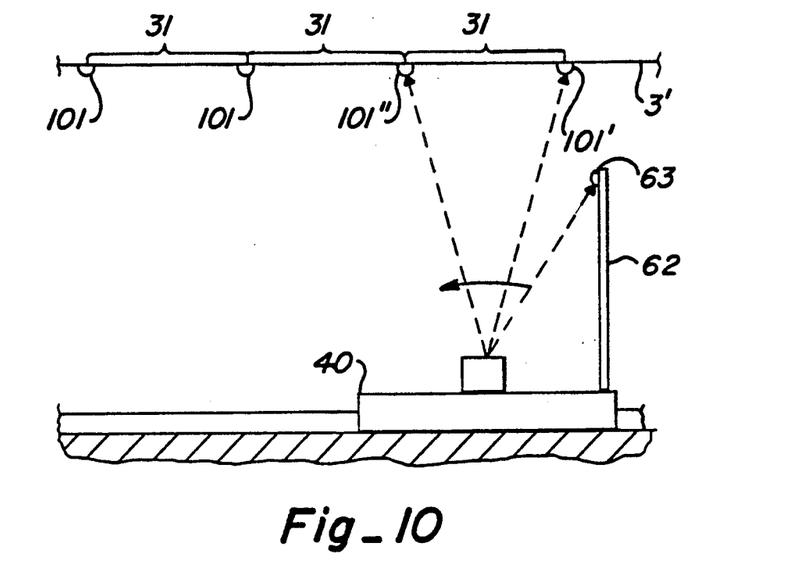
FIG. 10 shows a pictorial view, similar to the view of FIG. 6, of an alternative embodiment of the present invention.

In lieu of a gauge bar and gauge marks, longitudinal alignment can be achieved by placing a set of light sensitive sensors directly on the drum adjacent to where the medium is mounted, and aligned with the edge of the segments. Such an arrangement is depicted in FIG. 10. The sensors 101, 101', 101" will perform the functions of the start-of-segment and end-of-segment sensors, as well as the gauge bar. The reference sensor 63 will still have to be mounted somewhere on the laser carriage 40, so that it is moved with the sweeping arrangement.

In FIG. 10, the reference sensor 63 is shown mounted on a strut 62; however, it may still perform its function located in a different position, as long as its position is constant with respect to the beam sweeping arrangement. Instead of sensing the beam reflecting off the gauge bar, the sensors 101, 101', 101" will sense the beam directly. Each sensor can perform the dual function of both a start-of-segment sensor and an end-of-segment sensor, depending on whether the segment 31 or 31' is to be scanned. Alternatively, different sensors can be used to perform the start-of-segment sensor function and the end-of-segment sensor function for each segment. When the sensors on the drum are above the sweeping arrangement, the signals from these sensors will be transmitted to the computer. These sensors can be partially painted over to produce sharper or peaked signals.

The computer measures two time lapses, the time lapse between the signals from the reference sensor 63 and the sensor 101' functioning as the start-of-segment sensor for the first segment, and the time lapse between the signals from the reference sensor 63 and the sensor 101" functioning as the end-of-segment sensor for the first segment. For the second segment, sensor 101" will act as the start-of-segment sensor while the next sensor 101 will act as the end-of-segment sensor. In this manner, which is very similar to the gauge bar embodiment, the computer can precisely determine the location of the segment to be scanned in relation to the sweeping arrangement and thus begin and end each raster line at the correct location. If the medium is transparent or translucent, these sensors can be located underneath the medium itself. Such a set-up could ensure longitudinal alignment throughout the coverage of a segment, instead of just at the beginning. This arrangement will also compensate for play or wobble in the various mounting devices which can result in mis-alignment or variations during the coverage of a segment.

Of course, if less resolution is required, fewer and wider segments can be used. Images of varying resolution can be plotted on a single machine by skipping over some sensors; such as, every other sensor, or every second or third sensor, etc. Accordingly, the segments will be twice or three times as wide. Similarly, this can be done on a plotter using a gauge bar as part of its alignment system. If desired, more sensors may be provided on top of the sensor platform, and the gauge bar can be tilted so that the sensors can be placed to the side of the sweeping beam, instead of on either end of the slotted area.

In the multiple sweeping arrangement embodiment, depicted in FIG. 3A, start and end sensors need not be used, because the beam sweeping devices do not move in a direction parallel to the raster lines, but instead remain stationary above their assigned segments. However, reference sensors can be used in order to aid in timing the start of the segment. If desired, start and end sensors can be used to ensure alignment.

Figure 13:
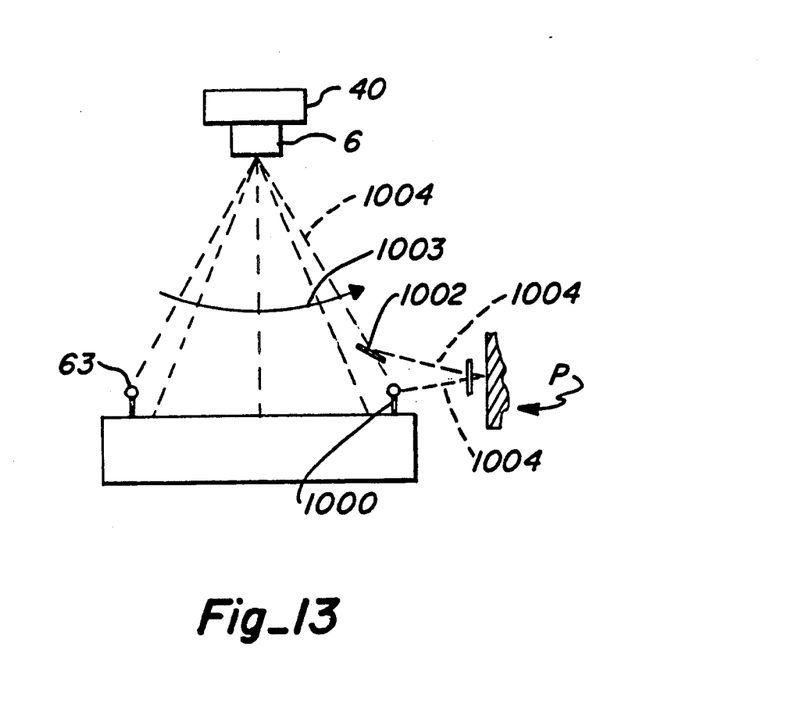
FIG. 13 is a pictorial view similar to FIG. 6 showing another embodiment of the invention.

When the embodiment shown in FIG. 6 is used, longitudinal alignment is achieved by mounting a reference sensor 63 on the laser carriage 40 and supporting structure 40" that mounts the sweeping arrangement 6, the photosensitive drum 3 and other optical components, as shown in FIG. 13. The reference sensor 63 performs the function of the start-of-segment sensor as described previously.

The transverse alignment problem can be solved in a variety of ways. In the preferred embodiment shown in FIG. 4A, a second order servo control loop can be used. This entails the use of a drum encoder 48, which reads the position of the drum 3', and a motor encoder 47, which reads the velocity of the motor 44 rotating the drum 3'. By continuously monitoring both the position of the drum 3' and the speed with which it rotates, the segments 31 can be aligned transversely with great accuracy.

In the embodiment of FIG. 13, a transverse start sensor 1000 is also mounted on the laser carriage assembly to determine the position of the first raster line in the segment as the laser carriage assembly moves in the imaging direction which is orthogonal to the raster-scan line. The transverse start sensor 1000 senses the laser beam 1004 which is reflected by mirror 1002, attached to the moving laser carriage assembly, and when it is first reflected by mirror 1001 which is attached to the stationary plotter assembly P.

As seen in FIG. 6, a computer, or data processing system, 49 is used to receive data from the drum encoder 48, the motor encoder 47 and the light sensitive sensors. The computer 49 uses this information, as well as information inputted to the computer for describing the image to be plotted. In this way the computer controls (1) the rotation of the drum 3' by means of the motor 44, (2) the movement of the laser carriage 40 by means of the placement mechanism 41, and (3) the sweeping arrangement 6, including turning the laser beam on and off, controlling the intensity of the beam and regulating the speed of the sweep. The computer 49 must also manipulate the input information to be plotted by the device. Because there are far fewer turn-on and turn-off commands in each of the short raster lines which span the width of the segment and not the width of the entire image, the memory and simultaneous processing requirements of the computer 49 of the present invention are less than those of the prior art devices.

The image of a printed circuit board is an image that is frequently plotted. Printed circuit boards, engineering drawings and other images, can often be depicted by a set of lines, called vectors, and a standard set of non-linear, non-rectangular icons, such as pixels or dots. For plotting such images on a prior art plotter, Gerber plot files are typically used. Plot primitives, representing a positively sloped vector, a horizontal or vertical vector, and apertures or constructs, are typically used. Images consisting mostly of vectors can be readily plotted on paper by pen-plotters. The information the pen-plotter needs to plot each vector is relatively simple, i.e. coordinates for one end of the line to be drawn (X1, Y1), coordinates for the second end of the line to be drawn (X2, Y2), and the width of the pen to be used in plotting the vector (W).

Figure 11A:
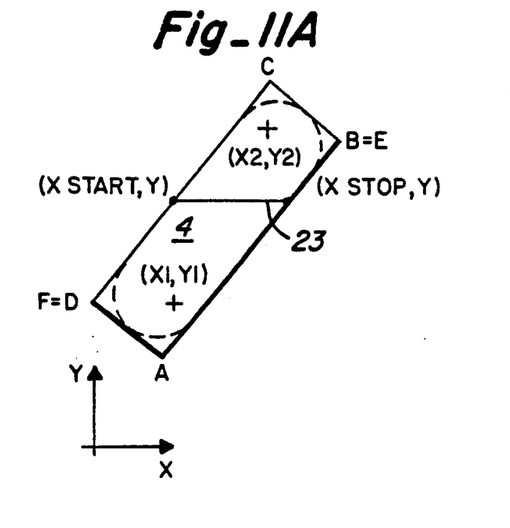
FIGS. 11a-11m show diagrammatical views of how vectors and apertures may be segmented on the medium.
Figure 11B:
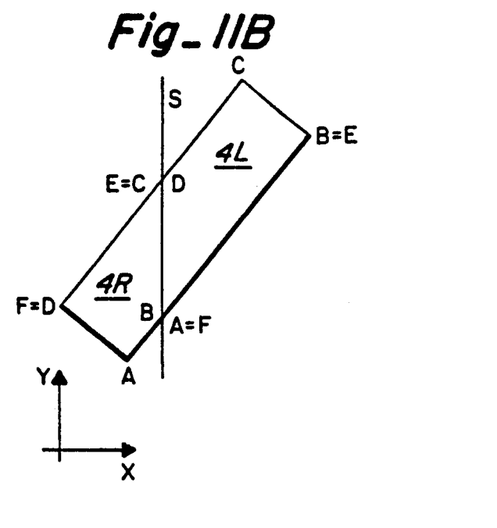
Figure 11C:
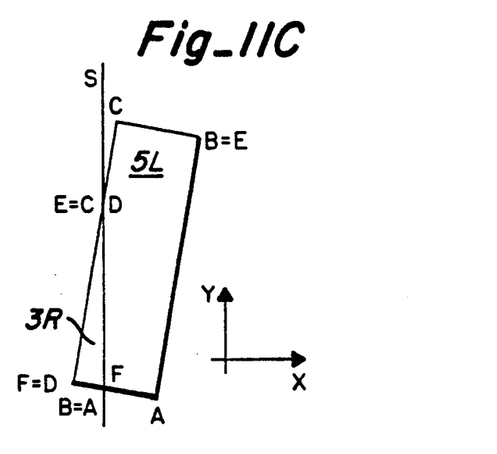
Figure 11D:
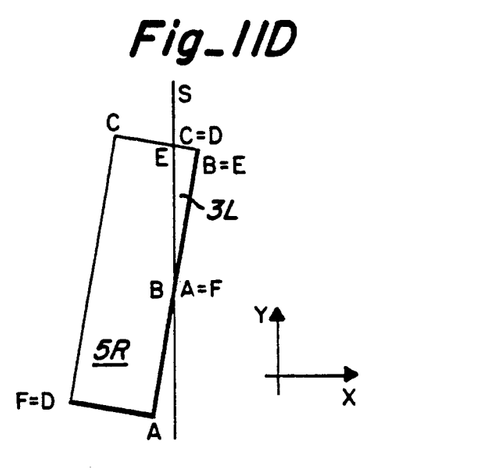
Figure 11E:
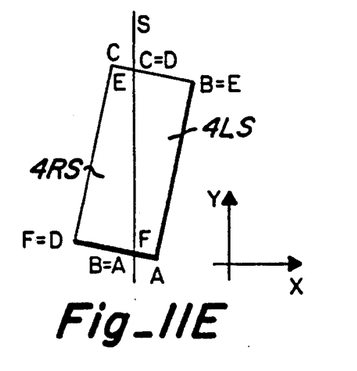

Raster-plotters need more detailed information to plot a vector. Because raster lines are typically very thin (the dot size in one embodiment of the invention can be only 0.0015 inches (38 microns)), many raster lines intersect the vector being plotted. Each raster line that intersects the vector is represented by a Y-coordinate, and each line has an XSTART coordinate and an XSTOP coordinate indicating, respectively, when to turn the beam on and when to turn it off. Often, a raster line intersects several vectors, and therefore has several XSTARTs and XSTOPs. Raster-plotters typically plot vectors as rectangles as shown in FIG. 11a, which also shows with dotted lines the rounded ends of the same vector as it would be plotted by a pen-plotter. FIG. 11a also shows one of the raster marks 23 that would be plotted in order to form the vector. It is well known in the art how to convert vector information from pen-plotter format (X1, Y1, X2, Y2, W) to raster-plotter format (XSTART, XSTOP, Y).

There are several ways the regular raster-plotter format can be segmented, so that it can be readily plotted on the present invention. In the preferred embodiment with a single beam sweeping arrangement, a method for converting the information into a segmented format can be used that would permit "on-the-fly" rasterization, which means that the final processing steps involved in converting the vector information into raster information can be performed quickly with relatively low peak processing and memory requirements.

FIG. 11a shows a vector that has not been segmented. This vector is defined by its four corners, A, B, C and D. This vector has a positive slope, i.e. it rises as it goes from left to right. A vector with a negative slope can be treated as a positively sloped vector that is very short and very wide. Likewise, a horizontal vector can be a short, wide vertical vector. FIGS. 11b through 11e show vectors that are intersected once by a segmentation line S, which is depicted by the vertical lines. These vectors are divided into polygons with three, four and five corners. FIGS. 11i through 11m show vectors that are intersected twice by segmentation lines S1, S2. These vectors are divided into polygons with three, four, five and six corners. Thus, each segmented vector polygon can be defined by six corners or less, and a hexagon with points A, B, E, C, D and F as its corners, as depicted in FIG. 11n, is used as the basis for describing all of the polygons. Note that points F and D have the same X coordinate, points B and E have the same X coordinate, side AB is parallel to side DC, side CE is parallel to side FA, and the slope of FA and CE is negative inverse of the slope of DC and AB.

Figure 11F:
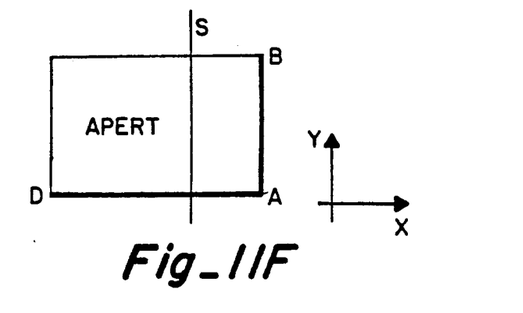
Figure 11G:
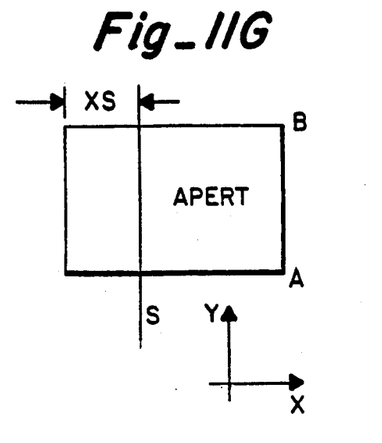
Figure 11H:
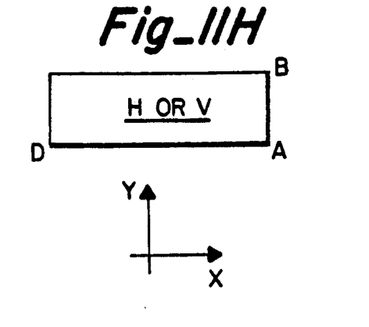
Figure 11I:
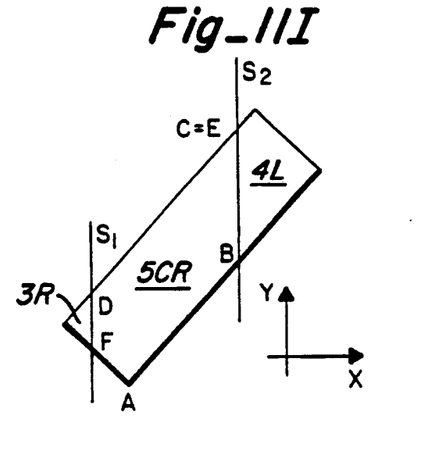
Figure 11J:
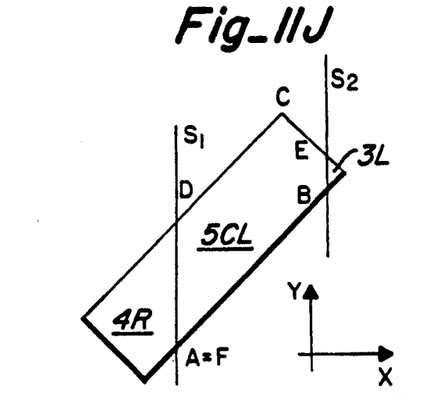
Figure 11K:
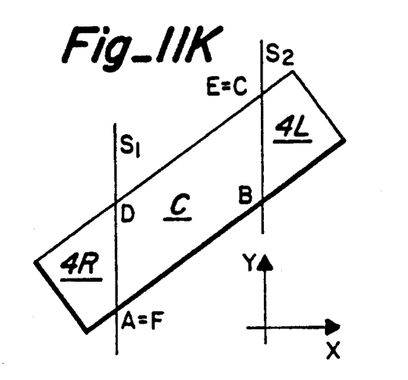
Figures 11L, 11M:
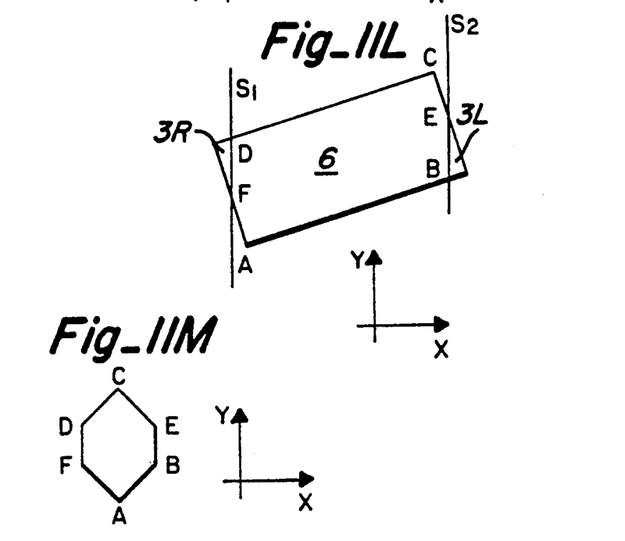

FIG. 11m shows a six-sided polygon labeled as a Type 6. This Type 6 polygon is represented by the following twelve word record:

TABLE 1

| Word: | | | | | | | | | | | |
|---|---|---|---|---|---|---|---|---|---|---|---|
| 1 | 2 | 3 | 4 | 5 | 6 | 7 | 8 | 9 10 | | 11 12 | |
| 1 | YA | XA | YB | YC | YD | YE | YF | DY/DX | | DX/DY | |

The first word contains a code indicating what kind of plot primitive is being represented, i.e. "1" being a positively sloped vector, "3" being a vertical vector, and "2" being an aperture or construct. The second and third words contain the Y and X coordinates of corner A. The fourth through eighth words contain the Y coordinates for the remaining corners. The ninth through twelfth words contain the slope of the vector and its inverse. This record contains all of the information needed to represent this type of hexagon, which has two vertical sides in which each side is parallel to another side.

The remaining polygons and plot primitives, can be represented using the same six-corner record format:

TABLE 2

| Type | Word | | | | | | | | | |
|---|---|---|---|---|---|---|---|---|---|---|
| | 1 | 2 | 3 | 4 | 5 | 6 | 7 | 8 | 9 10 | 11 12 |
| 3L | 1 | YA | XA | YB | YC | YC | YB | YA | DY/DX | DX/DY |
| 3R | 1 | YA | XA | YA | YC | YD | YC | YD | DY/DX | DX/DY |
| 4 | 1 | YA | XA | YB | YC | YD | YB | YD | DY/DX | DX/DY |
| 4L | 1 | YA | XA | YB | YC | YD | YB | YA | DY/DX | DX/DY |
| 4R | 1 | YA | XA | YB | YC | YD | YC | YD | DY/DX | DX/DY |
| 4LS | 1 | YA | XA | YB | YC | YC | YB | YF | DY/DX | DX/DY |
| 4RS | 1 | YA | XA | YA | YC | YD | YE | YD | DY/DX | DX/DY |
| 5L | 1 | YA | XA | YB | YC | YD | YB | YF | DY/DX | DX/DY |
| 5R | 1 | YA | XA | YB | YC | YD | YE | YD | DY/DX | DX/DY |
| 5CR | 1 | YA | XA | YB | YC | YD | YC | YF | DY/DX | DX/DY |
| 5CL | 1 | YA | XA | YB | YC | YD | YE | YA | DY/DX | DX/DY |
| C | 1 | YA | XA | YB | YC | YD | YC | YA | DY/DX | DX/DY |
| 6 | 1 | YA | XA | YB | YC | YD | Y | YF | DY/DX | DX/DY |
| HorV | 3 | YA | XA | YB | | | | | | XD |
| APERT | 2 | YA | XA | YB | YC | YD | | | | XS XD |

In the preferred embodiment of the invention the preceding processing steps, i.e. (1) converting the vector information from pen-plotter format to four-corner format and (2) segmenting the vector information, i.e. converting it into six-corner format, can be done by a computing or data processing unit equivalent to a "PC-AT" computer. This computing unit also sorts the records by the YA values in ascending order. These records are then sent to a vector-to-raster-converter (VRC), which computes the XSTARTs and XSTOPs. The steps remaining in the vector to raster conversion can be performed by the VRC as fast as the image can be plotted, thereby permitting "on-the-fly" rasterization.

When the VRC is computing the XSTARTs and XSTOPs for raster line NA-1, it comes upon a record for a vector that starts on line NA-a, the vector's YA coordinate equals NA-1. The VRC adds two entries, XSTART and XSTOP, to the record. Taking the Type 6 polygon's record for example, XSTART and XSTOP would both be equal to XA, the only point of the vector intersecting raster line NA. Of course, for a horizontal or vertical vector, XSTART would equal XD and XSTOP would equal XA. To modify the record for the next raster line NA, the VRC substitutes NA for YA, and according to the slope information, DY/DX and DX/DY, subtracts the appropriate amount from XSTART and adds the appropriate amount to XSTOP. The record for the Type 6 vector polygon will look like this:

TABLE 3

| Word | | | | | | | | | | | | | |
|---|---|---|---|---|---|---|---|---|---|---|---|---|---|
| 1 | 2 | 3 | 4 | 5 | 6 | 7 | 8 | 9 10 | | 11 12 | | 13 | 14 |
| 1 | XA | NA | YB | YC | YD | YE | TF | DY/DX | | DX/DY | | XSTART | XSTOP |

For the next raster line, one is added to NA, and the appropriate amounts added and subtracted to XSTART and XSTOP. This process is repeated until the VRC reaches the raster line equal to YF or YB. when YF is reached, XSTART remains constant (it has the same X coordinate as the first segment line bounding the segment) until YD is reached, at which point appropriate amounts based on the slop of the vector are added to XSTART. When YB is reached, XSTOP remains constant (it has the same X coordinate as the second segment line) until YE is reached, at which point appropriate amounts based on the slope of the vector are subtracted from XSTOP. When YC is reached, XSTART and XSTOP are once again the same point, and the polygon is completed, and the record representing the polygon can be dropped from the VRC memory. The other polygon types can be rasterized in a similar fashion.

Horizontal and vertical vectors (FIG. 11h) are quite easy to segment, because, when such a vector is segmented, the resulting polygons are also horizontal or vertical vectors. Segmented and unsegmented, horizontal and vertical vectors can be represented by coordinates XA, YA, YB and XD as shown in Table 2 above.

Apertures or constructs are also not difficult to segment. An aperture file, which is typically in ASCII, already contains a set of Y, XSTART and XSTOP coordinates for the icon to be plotted. More than one pair of XSTART and XSTOP coordinates can be located on each line of the aperture. To plot the segmented aperture shown in FIG. 11f, XSTOPs can be inserted where the segment line intersects the aperture, and the XSTARTs and XSTOPs to the right of the segment line can be ignored. To plot the segmented aperture shown in FIG. 11g, the XSTARTs and XSTOPs to the left of the segment line can be ignored, (they should have been plotted in the previous segment) XSTARTs can be inserted where the segment line intersects the aperture, and amount XS, representing the length along the X-axis of that portion of the aperture plotted in the previous segment, can be subtracted from the remaining XSTART and XSTOP coordinates.

In one of the embodiments, where the segments are approximately two inches wide, there are 2,047 pixels used in a two-inch length of raster line. Of course, different numbers of pixels can be used. If the segments vary in size, the segments can have different numbers of pixels. Even with the use of a precision machined gauge bar the number of pixels may vary slightly. As noted above, the beam sweeping across the gauge can measure the size of the segment, as shown in FIG. 6. For each raster line, an output memory list representing the 2,047 pixels (numbered 0 through 2,046) is created by reading the fourteen-word polygon record. For every XSTART coordinate, a positive one (+1) is put in the appropriate address. For every XSTOP coordinate, a negative one (−1) is put in the appropriate address. If a single address has multiple commands, the positive and negative ones are added together. For Example:

| Pixel #0: | +1 | (representing the XSTART of a first vector polygon) |
| Pixel #105 | +2 | (representing the XSTARTs of two overlapping vector polygons) |
| Pixel #442: | −1 | (represent the XSTOP of the second vector polygon) |
| Pixel #516: | −1 | (representing the XSTOP of the first vector polygon) |
| Pixel #760: | −1 | (representing the XSTOP of the third vector polygon) |
| Pixel #1,583: | +1 | (representing the XSTART of a fourth vector polygon) |
| Pixel #2,046: | −1 | (representing the XSTOP of the fourth vector polygon) |

In this way the plotter can handle overlapping vectors. As the beam sweeps from the first pixel to the last, the modulator controlling the beam adds the amounts in the pixel memories; when the sum is a positive integer the beam is on, when the sum is zero the beam is off. In the above example, the beam turns on at Pixel #0, where the sum is one. When Pixel #105 is reached, the sum is three, so the beam remains on. The arithmetic sum remains greater than zero until Pixel #760, when the sum becomes zero and the beam turns off. The beam turns on at Pixel #1,583 and off at Pixel #2,046, the end of the raster line.

This embodiment uses two output memories. At any given time, one output memory is read by the beam modulator, while the other receives the output from the VRC processor. When the plotting of a raster line is finished, the modulator reads the memory with the fresh VRC output, while the other memory, which has just been read by the modulator, is used to receive the next output from the VRC processor. Because the raster lines being plotted are only two inches wide, the memory and peak processing requirements of the invention are relatively small. If bigger segments are used, of course, the processing and memory requirements will increase.

Figure 12:
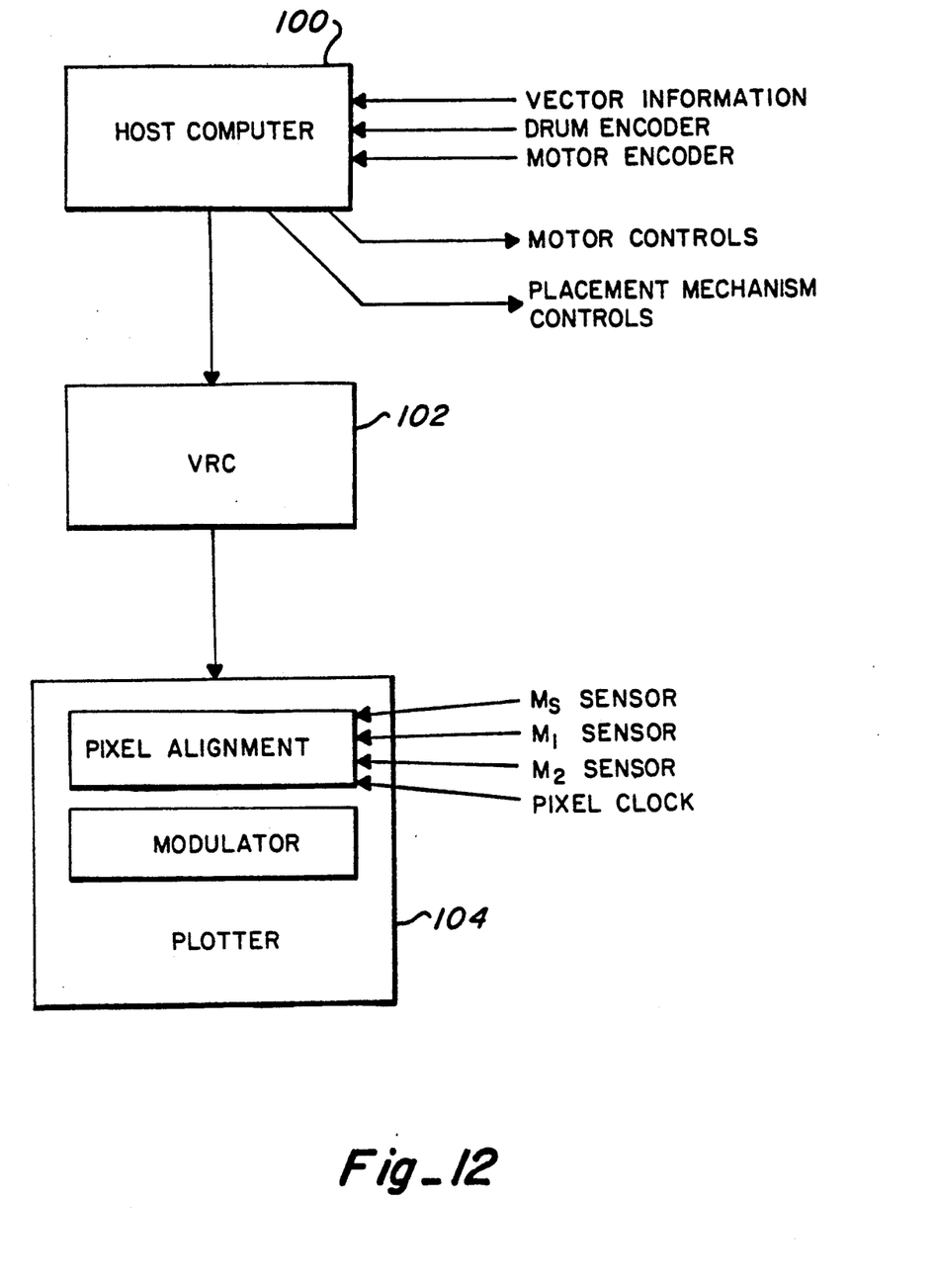
FIG. 12 is a diagram showing the information processing a method for the preferred embodiment of the invention.

FIG. 12 shows, in a simplified manner, the information or data processing components of the preferred embodiment of the invention. As noted above, some of the data processing can be done by a typical "PC-AT" computer 100. At the same time some of the data processing is done on a VRC 102 which is a special purpose processor. The remaining data processing is done on circuitry located on the plotter platform 104. Not withstanding the above, the processing functions can be arranged in different devices. For example, all of the data processing can be done on the host computer 100, if desired.

The host computer 100 performs several functions: (1) it converts vector information from pen-plotter format to four-corner record format, if necessary; (2) it converts four-corner record format to six-corner record format, if necessary (of course, the host computer can receive input in four-corner or six-corner format, instead of in pen-plotter format); (3) it controls the motor based on the data it receives from the motor and drum encoders; (4) it controls the placement of the laser carriage; (5) it provides system control and drives the VRC; and (6) it provides an interface to the plotter user. The VRC 102 converts the six-corner records into records that tell the laser modulator when to turn on and off during the sweep of a raster line. On the plotter 104 is located electronic circuitry for pixel alignment, which basically provides information to the beam modulator as to when to begin and end the segment based on the signals received from the reference sensor MS, start-of-segment sensor M1 and end-of-segment sensor M2. The pixel alignment electronics uses a pixel clock to keep track of the length of the offset and the width of the segment. (See FIG. 8.)

Throughout this application it is to be understood that any kind of energy beam generator can be used to provide the image scanning arrangement. This generator could produce a high energy laser beam, a high intensity light beam, a high electro-magnetic energy beam or any other beam which in conjunction with the appropriate medium will produce the desired imaging results.

While an improved large format plotter has been shown and described in detail in this application, it is to be understood that this invention is not to be limited to the exact form disclosed and changes in detail and construction of the various embodiments of the invention may be made without departing from the spirit thereof.

What is claimed is:

1. A device for plotting an image on a large format medium comprising:
    a) means for dividing the surface of the medium into a plurality of segments, each segment having a narrow width with respect to length;
    b) beam sweeping means for projecting a beam onto a segment of the medium to form a portion of the image, said sweeping means being arranged to cause the beam to repetitively sweep raster lines across the width of the segment;
    c) movement means for moving the medium in relation to the beam sweeping means in a direction transverse to the raster lines;
    d) said movement means further including placement means to move the beam sweep means to an adjacent segment after the previous segment has been swept; and e) alignment means for aligning the segments of the image in a direction generally parallel to the raster lines, such that there is neither an overlap of the segments nor a space between the segments.

2. A device according to claim 1, further including one or more additional beam sweeping means for sweeping a corresponding number of segments at the same time.

3. A device according to claim 1, where in the placement means moves the beam sweeping means in a direction generally parallel to the raster lines swept by the beam sweeping means.

4. A device according to claim 3, further including:
a mounting device to which the medium is mounted; and
the alignment means further includes:
a gauge bar affixed to the mounting device, the gauge bar having a reflective surface and having a series of non-reflective gauge marks delineating the borders between the segments;
a reference sensor attached to the beam sweeping means, said reference sensor being arranged to produce an output signal when the beam sweeps across the reference sensor at the start of the sweep;
a start-of-segment sensor attached to the beam sweeping means that produces an output signal indicating when the beam sweeps across a first gauge mark; and
an end-of-segment sensor attached to the beam sweeping means that produces an output signal indicating when the beam sweeps across a second gauge mark, said start and end-of-segment sensors delineating the edges of the respective segment.

5. A device according to claim wherein the alignment means includes:
a reference sensor that is located in a constant position in relation to the beam sweeping means, said sensor produces an output signal when the beam sweeps across the reference sensor at the start of the sweep.

6. A device according to claim 5, wherein the alignment means further includes:
a start sensor and an end sensor that produce output signals when swept by the beam indicating where the beam sweeping means should start and end the raster lines spanning the respective segment which is being imaged.

7. A large-format plotter for plotting an image on the surface of a large size medium, said medium being sensitive to a beam which traces the desired image, the plotter comprising:
a) data processing means for receiving data representing a desired image, said data processing means being capable of dividing the image into a plurality of segments, the total number of the segments covering, at least a portion of the surface of the medium;
b) beam generating means for generating a high energy beam and sweeping the beam across the width of a segment, the repetitive sweeps of the energy beam producing a series of parallel raster lines across the width of the segment on the surface of the medium;
c) movement means for moving the medium in relation to the beam generating means in a direction transverse to the raster lines whereby a portion of the image for the respective segment will be produced on the surface of the medium.

8. A plotter as defined in claim 7, wherein the movement means further includes a placement means whereby the medium is moved sequentially in relation to the beam generating means to a centered position with respect to each of the segments so that the beam generating means can sweep the surface area of the medium represented by each of the segments until the entire image is produced on the surface of the medium.

9. A plotter device as defined in claim 8, which further includes an alignment means for aligning the beam generating means with respect to the segments of the image so that the corresponding raster lines in each segment will connect but not overlap to form the image.

10. A plotter as defined in claim 7, wherein a plurality of beam generating means are provided for simultaneously sweeping a corresponding number of segments of said image.

11. A plotter as defined in claim 7, which further includes placement means for moving the beam generating a means in relation to the medium in a direction generally parallel to the raster lines swept by the beam generating means so that individual segments of the image can be swept in sequence so as to form the entire image on the surface of the medium.

12. A plotter as defined in claim 9, wherein the alignment means includes a mounting means for supporting the medium and means for identifying the edges of the respective segments so that the data processing means can control the sweep of the beam generating means to precisely position the edges of the segments so that the raster lines contact but do not overlap.

13. A plotter as defined in claim 12, wherein the edge identifying means includes a gauge bar affixed to the mounting means, the gauge bar having a reflective surface and a series of equally spaced non-reflective marks corresponding to the edges of the segments said means further including reference sensor means arranged so that the beam sweep produced by the beam generating means produces an output signal when the beam sweeps across a non-reflective mark on said gauge bar so as to identify the edges of the respective segment that is being swept.

14. A plotter as defined in claim 13, wherein the reference sensor means further includes a start-of-segment sensor attached to the beam generating means that produces an output signal indicating when the beam sweeps across a first non-reflective gauge mark, and an end-of-segment sensor attached to the beam generating means that produces a second output signal indicating when the beam sweeps across a second non-reflective gauge mark identifying the opposite edge of the respective segment.

15. A plotter as defined in claim 7, wherein the beam generating means produces a laser beam projecting a circular pattern on the surface o the medium, the diameter of the pattern being between 25 to 100 microns.

16. A plotter as defined in claim 7, wherein the segments are divided into approximately two inch width increments whereby the beam produced by the beam generating means as it sweeps the width of the segment will not be distorted along the outer edges of said segment.

17. A plotter as defined in claim 7, wherein the medium is mounted on the surface of a cylindrical drum and the movement means continuously rotates the drum so that the sweeping beam continuously forms raster lines across the width of the respective segment.

18. A plotter as defined in claim 17, wherein the movement means further includes placement means for moving the beam generating means longitudinally in relation to the medium mounted drum whereby the beam can sweep a series of adjacent segments across the surface of the medium.

19. A plotter device as defined in claim 7, wherein the beam generating means projects the beam onto the surface of a rotating cylindrical drum which is coated with a photoconducting material, the movement means further including placement means for longitudinally moving the beam generating means along the axis of the rotating drum in sequential steps whereby the beam generating means is centrally aligned with each of the segments formed across the surface of the medium.

20. A plotter as defined in claim 19, which further includes means for electrostatically charging the photoconducting surface of the drum after the image has been projected on the surface of the drum, application means provided for applying a thin layer of properly charged medium to the surface of the drum to outline the swept image, and transfer means for transferring the charged medium to the surface of a second medium, said transfer means including means for fixing the charged medium on the surface of the second medium.

21. A plotter as defined in claim 20, wherein the charged medium is a suitable toner and the second medium is plain paper.

22. A plotter as defined in claim 19 wherein the length of the drum is generally the width of one segment which is swept by the beam generating means.

23. A plotter as defined in claim 9, wherein the edge identifying means includes sensors mounted on the surface of the mounting means, said sensors being precisely positioned at the edges of the segments whereby as the beam from the beam generating means contacts the sensors an output signal will be fed to the data processing means to control the sweep of the beam.

24. A large-format plotter for plotting an image on the surface of a large sheet type medium, said medium being capable of receiving the image which is traced by a high energy beam, the plotter comprising:

a) a data processing means for receiving data representing a desired image, said data processing means being capable of dividing the image into a plurality of segments, the total number of the segments covering at least a portion of the surface of the medium;

b) beam generating means for generating a high energy beam and sweeping the beam across the width of a segment, the repetitive sweeps of the energy beam producing a series of parallel raster lines across the width of the segment on the surface of the medium;

c) movement means for moving the medium in relation to the beam generating means in a direction transverse to the raster lines whereby a portion of the image for the respective segment will be produced on the surface of the medium;

d) placement means for sequentially positioning the beam generating means in relation to the mechanism so that the beam generating means is centrally positioned with respect to each segment whereby the segment can be swept forming the entire image on the surface of the medium; and e) alignment means for aligning the corresponding lines in each segment and controlling the beam so that the raster lines connect but do not overlap in forming the image.

25. A plotter as defined in claim 24, wherein the data processing means includes a vector-to-raster converting means, whereby the image data can be converted to raster-plotter format and segmentized prior to being input to the beam generating means.

26. A device according to claim 1, wherein the movement means continuously moves the medium in relation to the beam sweeping means.

27. A plotter as defined in claim 7, wherein the movement means continuously moves the medium in relation to the beam and generating means.

28. A plotter as defined in claim 24, wherein the movement means continuously moves the medium in relation to the beam generating means.

* * * * *